(12) United States Patent
Oucharek et al.

(10) Patent No.: US 12,192,282 B1
(45) Date of Patent: Jan. 7, 2025

(54) METHOD AND SYSTEM FOR MULTI-PATH NETWORK OPERATIONS BETWEEN STORAGE CLUSTERS

(71) Applicant: DATA DIRECT NETWORKS, INC., Chatsworth, CA (US)

(72) Inventors: Douglas Oucharek, Naramata (CA); Silvain Didelot, Gometz-le-Châtel (FR)

(73) Assignee: DataDirect Networks, Inc., Chatsworth, CA (US)

(*) Notice: Subject to any disclaimer, the term of this patent is extended or adjusted under 35 U.S.C. 154(b) by 0 days.

(21) Appl. No.: 18/504,434

(22) Filed: Nov. 8, 2023

(51) Int. Cl.
| | | |
|---|---|---|
| *G06F 15/16* | (2006.01) | |
| *H04L 45/28* | (2022.01) | |
| *H04L 67/1038* | (2022.01) | |
| *H04L 67/1097* | (2022.01) | |
| *H04L 67/133* | (2022.01) | |

(52) U.S. Cl.
CPC ......... *H04L 67/1097* (2013.01); *H04L 45/28* (2013.01); *H04L 67/1038* (2013.01); *H04L 67/133* (2022.05)

(58) Field of Classification Search
CPC ... H04L 67/1097; H04L 67/133; H04L 45/28; H04L 67/1038
See application file for complete search history.

(56) References Cited

U.S. PATENT DOCUMENTS

| | | | | |
|---|---|---|---|---|
| 8,914,540 B1* | 12/2014 | Barooah | ................. | G06F 3/067 |
| | | | | 709/244 |
| 10,686,763 B2* | 6/2020 | Kantecki | ............. | H04L 63/0442 |
| 11,023,134 B1* | 6/2021 | Rao | ........................ | G06F 3/0685 |
| 2024/0126459 A1* | 4/2024 | Gokam | ................. | G06F 3/0617 |

* cited by examiner

*Primary Examiner* — Duyen M Doan
(74) *Attorney, Agent, or Firm* — Rosenberg, Klein & Lee (57) ABSTRACT

Multi-Path approach to data migration between nodes in distributed data storage systems is rendered by creating multiple connections between application cores across interfaces on both an initiator node and a target node and load balancing whole messages and RDMA operations over the various pathways routed via the same or different network fabric types. The Multi-Path approach adapts to applications which are core-affine and those which are not. The balancing of whole messages/RDMA operations is performed by a send/receive API command specifying the target node for the whole message (and optionally a core number in the case of a core-affine target). The Multi-Path approach adapts dynamically to network errors by excluding faulty pathways, as needed, and shifting traffic to remaining healthy pathways with background recovery of pathways running periodically for self-healing. The Multi-Path also adapts dynamically to the load by diverting traffic from slow pathways and favoring pathways with normal load.

20 Claims, 8 Drawing Sheets

METHOD AND SYSTEM FOR MULTI-PATH NETWORK OPERATIONS BETWEEN STORAGE CLUSTERS

FIELD OF THE INVENTION

The present invention is directed to data migration between high performance computing architectures (also referred to herein as data generating entities, or client nodes) and data storage media (also referred to herein as server nodes, storage nodes, or peer nodes). In particular, the present invention relates to a data migration technique rendering load balanced messaging and RDMA (Remote Direct Memory Access) operations over numerous pathways which can be routed via the same or different fabric types, such as, for example, Infiniband, Ethernet, etc., as well as using different protocols within a single fabric type.

Further, the present invention relates to a distributed data storage system, the operation of which is supported by a Multi-Path solution (also referred to herein as a Multi-Path sub-system) capable of creating multiple connections between application CPU cores across multiple interfaces on both an initiator of a message (for example, a client node) and a target node (for example, a storage node), and load balancing the messages and RDMA operations over those multiple connections.

In addition, the present invention addresses the Multi-Path algorithm which is configured for avoiding faulted paths and is capable of adaptation to the load, i.e., if a pathway for communication of a message becomes slow, the traffic for this pathway is automatically reduced and other pathways are favored.

The present invention also addresses data migration between high performance computing cluster architectures and data storage media adapted to core affine architectures, such as, for example, in High Performance Computing (HPC), as well as those which are not core affine applications, where the balance of messages/RDMA operations are attained by a simple send/receive Application Programming Interface (API), where the application only specifies the target node for a message and, optionally, a core number (in the case of a core-affine target node).

Furthermore, the present invention is directed to data migration between high performance computing cluster architectures and data storage media which is focused on balancing complete (whole) messages (preferably in the Remote Procedure Call (RPC) protocol format) rather than packets or connections, where each pathway is given credits and a weight to be used to control the balancing of messages over possible pathways, to render a form of weighted "round-robin" which is capable of dynamic adaptation.

The present invention is further directed to the whole message transmitting where the whole message is created and sent over a "selected" pathway. If the message sends correctly, the transmission is completed, but if, however, the message is not sent in a correct manner, a different pathway is selected, and the message is sent over the different pathway which can be routed via the same or a different fabric type. The transmission of the whole message continues until either no pathways remain available or until the message is sent.

The present invention is further related to the Multi-Path connection protocol between data generating entities and data storage media which adapts dynamically to network errors, determining and excluding from operation faulty pathways, as needed, and shifting data migration traffic to remaining healthy pathways, where the Multi-Path connection is capable of running periodic self-healing routine for the background recovery of pathways.

The present invention also addresses a data storage approach which is highly efficient and scalable for systems where a message order is of low importance, and which adapts and efficiently self-heals, as well as provides a simplified implementation of a "fragile RPC" (Remote Procedure Call) approach to the application.

The present invention further addresses the system and method for data migration within data storage environment capable of transmitting RPC (Remote Procedure Call) messages above the transport layer to allow communication of the messages through numerous pathways routed over a single or various network type(s) of fabric. Storage server nodes are arranged in clusters, for example, RED clusters, and upper layers specify a specific peer (node) in the RED cluster to which the message is to be sent, while the Multi-Path system selects the pathway for the message to be transmitted over. The pathway can be changed dynamically without affecting the upper layers in the system.

The present invention is also directed to a data storage system having the ability to route messages between CPU cores that the application is bound to, where each node includes a number of interfaces and CPU cores. Each CPU core directly accesses the local interfaces, and, once a connection between the CPU core and the interfaces in the node is created, the connection is anchored to the CPU core and only that CPU core can access this connection, thus improving the performance of the subject system by avoiding locks and memory sharing.

In addition, the present invention is directed to the system and method for data migration where a single complete (or whole) message is sent over the same interface (and therefore the same fabric). However, a series of messages can be sent over different interfaces through different fabric types, i.e., one message can be sent over, for example, an Ethernet network using TCP/IP protocol, while the next message can be sent over, for example, an Infiniband network supporting RDMA capabilities.

The present invention is also directed to a system and method for data migration where the traffic profile is designed either for client-to-server or server-to-server connection(s), supporting the servers in communication with each other, so that the system is not specific to client-server architectures, but rather to node-node architectures, where the nodes may be represented by combination of clients and/or servers.

BACKGROUND OF THE INVENTION

Computer clusters, or groups of linked computers, have been widely used to improve performance over that provided by a single computer, especially in extended computations. Conventionally, computer nodes (which may be envisioned as client nodes, or data generating entities, as well as storage nodes, or storage server nodes) are linked in a computer cluster by a high-speed network. This approach permits sharing of computer resources and memory.

Data transfers to or from, as well as between, the computer nodes are performed through the high speed network and are managed by additional computer devices, also referred to as file servers. The file servers file data from multiple computer nodes and assign a unique location for each computer node in the overall file system. Typically, the data migrates from the file servers to be stored on a rotating media such as, for example, common disk drives arranged in storage disk arrays, or solid state storage devices for storage and retrieval of large amounts of data. Arrays of solid state storage devices, such as flash memory, phase charge memory, memoristors, or other non-volatile storage units are also broadly used in data storage systems.

Having extensive data transfer traffic, a data migrating system requires a highly scalable approach to achieve improved bandwidth, lower average latency, and reliability. Typically, these parameters tend to be attained through installation of interfaces with larger bandwidths, as, for example, is reflected in the Multi-Rail system shown in FIG. 1.

Figure 1:
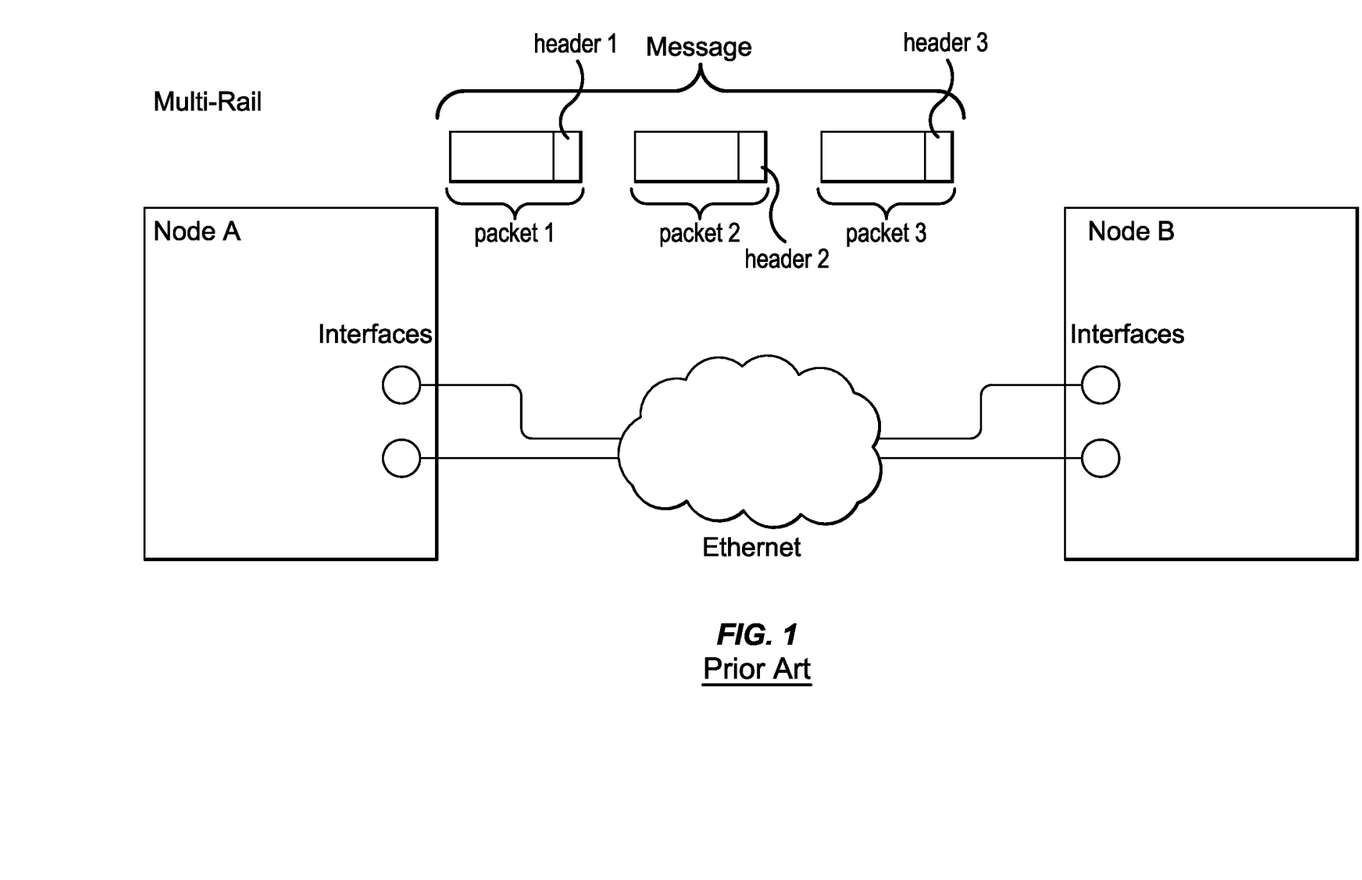
FIG. 1 is the architecture of the prior art Multi-Rail system with a single Ethernet interface fabric type.

As depicted in FIG. 1, a Node A and a Node B communicate with each other. Each of the Nodes A and B includes a number of interfaces interconnected through a single network communication fabric, for example, Ethernet. In the Multi-Rail system, the algorithms run at the transport layer and are applied to either packets (load-balancing packets over interfaces) or to connections (load-balancing connections over interfaces). The upper layers of software do not know about the underlying Multi-Rail operations, and the Multi-Rail interface is usually exposed to the upper layer software as a single device.

Due to the fact that the algorithms run at the transport layer, the system is dependent upon the fabric type, which prevents different network fabrics from being used for communication of the packets or connections. For example, the Multi-Rail technique cannot use, for example, the Ethernet fabric working with, for example, the Infiniband fabric, or a different combination of fabrics.

In FIG. 1, the Nodes A and B are shown to include two physical interfaces, which will be exposed to the upper layer software as a single interface, each connected to the Ethernet-based fabric. Depending on the underlying algorithm, connections or packets can be load-balanced over the physical interfaces. A packet is a unit of transmission at the fabric's transport layer. To transport a packet, a message created at the source node (for instance, the node A) is "sliced up" into packets, usually based on the MTU (Message Transmission Unit), each with a transport header. So, for example, the TCP/IP (Transmission Control Protocol/Internet Protocol) transport layer will "slice up" the message into TCP/IP packets, each with a TCP/IP header. Thus, the packets having the TCP/IP headers must all migrate over the same TCP/IP fabric. Multi-Rail system, therefore, cannot route the messages over different fabric types.

The Multi-Rail system is substantially static and has a coupled configuration which cannot adapt dynamically to workload. In addition, the Multi-Rail system is somewhat limited in its reliability and scalability. For example, the Multi-Rail, as implemented in hardware/firmware, is limited to a single fabric type. In addition, Multi-Rail, as implemented in software, also limits the performance to a single fabric type. Multi-Rail, unfortunately, is not believed to be sufficient for obtaining improved bandwidths, lower average latency and reliability in the data migrating environment.

It is therefore a long-standing need in data migrating systems to provide improved bandwidth, lower average latency, and reliability by creating multiple dynamically interrelating connections between application CPU cores across multiple interfaces on both the initiator of the message and target nodes and load balancing the messages and RDMA operations over the connections which may be routed over different types of network fabric.

It also would be highly desirable to equip a data migrating system with the ability to dynamically define a healthy communication channel through numerous communication fabrics (network fabrics), where nodes (a source node and a target node) include a number of interfaces interconnected through numerous types of network fabric and a number of CPU cores with each CPU core creating connections over the various pathways between the source and target nodes, with each CPU core directly accessing the local interfaces. Once a connection is established, it is "anchored" to that CPU core, so that only the "anchored" CPU core can read/write the established connection in order to improve the performance of the system by avoiding locks in traffic and memory sharing.

SUMMARY OF THE INVENTION

It is, therefore, an objective of the present invention to provide a data migrating system which achieves a highly efficient and scalable operation, where the message order is of no importance, which dynamically adapts and self-heals in an efficient fashion, and which is designed for ease of implementation of a "fragile" RPC (Remote Procedure Call) protocol.

Another objective of the present invention is to provide a system for data migration in a node-node architecture format (with the nodes being any combination of clients and/or servers), where the nodes communicate with each other in an efficient manner, and where a single complete/whole message (including numerous packets) is sent over the same interface (and therefore fabric), but a series of whole messages may be sent over different interfaces over different network fabric types, where one message may pass, for example, over an Ethernet network, while another message can be sent, for example, over an Infiniband, or other network fabric type, and where different network protocols can be supported within a single fabric type (for example, an Infiniband fabric configured as Ethernet can simultaneously be accessed using TCP/IP and Verbs, which a two different network stacks with different protocols).

It is an additional objective of the present invention to provide a whole message transmitting protocol where the whole message is created and sent over a "selected" pathway. If the message sends correctly, the transmission is completed, but if, however, the message is not sent in a correct manner, a different pathway is selected, and the message is sent over the different pathway which can be routed via the same or a different fabric type. The transmission of the whole message continues until either no pathways remain available or until the message is sent.

Still another objective of the present invention is to provide a data migration system having a plurality of nodes (such as, for instance, client nodes and/or storage server nodes), where the communication between the nodes is routed through one or numerous network fabric types.

It is an additional objective of the present invention to provide a system with an increased resiliency, substantial scalability, and improved IOPS (I/O per second), which is essential for the scalability, as well as the improved throughput, where messages can arrive to target nodes in orders which are different than the orders they were sent from initiating nodes.

It is a further objective of the present invention to provide a Multi-Path approach in a data migration system which creates multiple connections between application cores across multiple interfaces on both the initiator and target nodes and load balancing the messages and RDMA operations over these connections.

An additional objective of the subject Multi-Path solution is to adapt to applications which are core affine, like in HPC (High Performance Computing) and those which are not, and where the balancing of messages/RDMAs and handling of RDMA errors are all attained in a simple manner by send/receive APIs (Application Programming Interfaces), where the application only requires specification of the target node for a message and, optionally, the CPU core number in the case of a core-affine target.

It is still another objective of the present invention to provide a data migration system which balances complete messages (rather than packets or connections, provided in the prior art Multi-Rail system), where each pathway is given credits (i.e., maximum number of outstanding messages) and a weight, which are used to dynamically control the balancing of messages over possible pathways, where, in the case of core affine applications, pathways which deliver messages to the destined CPU core are always given the highest priority.

A further objective of the present invention is to provide a Multi-Path approach to deliver messages over multiple pathways, which adapts dynamically to network errors by avoiding the faulted pathways, as needed, shifting traffic to remaining healthy pathways, adapting to the performance of the pathways (if one pathway becomes slow, the algorithm would adapt and reduce the traffic intended for this slow pathway), and periodically running background recovery of pathways (self-healing).

In one aspect, the present invention addresses a method for migrating data between compute nodes in a distributed storage system, which comprises the step of configuring a distributed storage system with a plurality of compute nodes and a Multi-Path sub-system integrated in the distributed storage system in operative coupling with the plurality of compute nodes which include at least one initiating node and at least one target node. The Multi-Path sub-system is configured on a dynamic networking logic layer above a transport logic layer.

The Multi-Path sub-system, in one embodiment, is contemplated for operation in conjunction with the RED data storage system where compute nodes may include a plurality of client nodes and/or a plurality of storage server nodes, and where the plurality of storage server nodes are arranged in a RED cluster. The multi-path communication may be established between the client nodes, or between a client node and a server node, or alternatively between the peer storage server nodes in the RED cluster(s).

The subject Multi-Path sub-system is configured with a plurality of initiating interface units incorporated in the initiating node and a plurality of target interface units incorporated in the target node, as well as a plurality of communication pathways which are operatively coupled between the plurality of initiating interface units and the plurality of target interface units.

The method continues by forming, by the distributed storage system, a whole message and incorporating an identification of the target node in the whole message. Preferably, the whole message is based on a Remote Procedure Call (RPC) protocol.

The subject method further proceeds by selecting, by the Multi-Path sub-system, a pathway from the plurality of communication pathways for sending the whole message in question, and sending the whole message from the initiating node to the target node over the selected pathway. If the whole message in question is sent correctly through the selected pathway, then the sending procedure is completed. If, however, the sending has not been accomplished correctly, then a different (alternative) pathway is selected, and the whole message in question is sent over an alternative pathway. The sending procedure continues until either there are no more pathways available for the message sending, or the message in question is sent correctly. The initially selected pathway and the selected alternative pathway(s) may be routed on the same network fabric type or on different network fabric types.

The present method is applicable for core affine applications as well as a non-core affine applications, and the Multi-Path sub-system is dynamically adaptable to both architectures. For the core affine applications, the method includes the steps of incorporating a plurality of initiating CPU cores in the initiator node, and incorporating a plurality of target CPU cores in the target node. A connection is formed between each of initiating CPU cores to the plurality of initiating interface units, thus creating a plurality of initiating connections in the initiating node, and forms a connection between each of the plurality of target CPU cores to the plurality of target interface units, thus creating a plurality of target connections in the target node. For the core affine applications, the distributed storage system identifies a target CPU core for each message to be delivered to the target node, and the highest priority is assigned, by ranking, to a communication pathway delivering the message to the identified target CPU core in the target node.

One of the important features of the subject method is attained by dynamically adapting the Multi-Path sub-system to network errors by the steps of:

monitoring health of the plurality of communication pathways to determine at least one faulty communication pathway, excluding the faulty communication pathway from operation, shifting a data migration traffic to remaining healthy communication pathways of the plurality of communication pathways, and upon recovery of the faulty communication pathway, restoring the data migration traffic therethrough.

Also an important feature of the subject method is adapting dynamically the Multi-Path sub-system to network load by the steps of:

monitoring load of the plurality of communication pathways to determine at least one slow communication pathway,     reducing a data migration traffic for at least one slow communication path,     shifting the data migration traffic to remaining communication pathways of the plurality of communication pathways, and     upon decreasing of the load of the at least one slow communication pathway, restoring the data migration traffic therethrough.

In one of the embodiments, at least one reactor processor unit is embedded in each compute node in operative coupling of the reactor processor unit to the plurality of target CPU cores in each target node, and communicating the reactor processor units incorporated in the plurality of target nodes with each other to control the plurality of target connections in the plurality of target nodes regardless of the reactor processor unit residence.

Prior to sending the messages to the target node, the present Multi-Path sub-system establishes a control channel between the initiating node and the target node by the steps of: sending, by the initiating node, a workload request to the target node, where the workload request identifies a workload type corresponding to the whole message intended for sending to the target node and a desired value of Remote Procedure Calls (RPCs) inflight, subsequent to receiving the workload request, defining, by the target node, a plurality of target CPU cores and a plurality of target interface units available for serving the receipt of the whole message in question, creating, by the target node, a list of identifications of the target CPU cores and the target interface units, sending, by the target node, the list to the initiating node; and, subsequent to receiving that list at the initiating node, creating, by the initiating node, a plurality of available pathways between the initiating CPU core and a corresponding target CPU core in accordance with the list.

The routine of creating the list of identifications of the plurality of target CPU cores is enhanced by plugging in of a workload balancing processor unit configured for selecting the plurality of target CPU cores for the workload type.

If the plurality of target CPU cores identified in the list is not available, the target node rejects the control channel established by the Multi-path sub-system, and requests the initiating node to establish an alternative control channel by forming an alternative list of the target CPU cores and of the target interface units available for receiving the whole message in question.

Preferably, subsequent to creating the multiple pathways, each between the initiating CPU core and a corresponding target CPU core, the subject method binds the message destined to the target node by a Weighted Fair Queue routine applied to the pathways to select a pathway for sending the whole message, wherein the Weighted Fair Queue routine considers a weight of all pathways, indication of a direct route between the initiating CPU core and the target CPU core, a number of RPC inflight messages, a depth of a send queue, and a measured latency of previous messages on the pathway.

In another aspect, the present concept addresses a distributed storage system for migrating data between compute nodes, which includes:

a plurality of compute nodes and a Multi-Path sub-system integrated in the distributed storage system in operative coupling with the plurality of compute nodes, where the plurality of compute nodes include at least one initiating node and at least one target node. The Multi-Path sub-system may be dynamically adapted for either core affine applications or non-core affine applications, and operates on a dynamic networking logic layer above a transport logic layer.

The Multi-Path sub-system is configured with a plurality of initiating interface units incorporated in the initiating node and a plurality of target interface units incorporated in the target node. A plurality of communication pathways are operatively coupled between the plurality of initiating interface units and the plurality of target interface units.

The present distributed storage system is configured for migrating whole messages, each incorporating an identification of the target node, from the initiating node to the target node over a series of communication pathways which may be selected either on the same network fabric type or on different network fabric types.

The present system further comprises a plurality of initiating CPU cores incorporated in the initiator mode, a plurality of target CPU cores incorporated in the target node, a plurality of initiating connections formed in the initiating node between each initiating CPU core and the plurality of initiating interface units, and a plurality of target connections formed in the target node, with each target connection formed between each of the plurality of target CPU cores and the plurality of target interface units.

In one of the preferred implementations, the subject Multi-Path sub-system is further adapted for dynamic self-healing by: monitoring health of the plurality of communication pathways to determine at least one faulty communication pathway, excluding the faulty communication pathway from operation, shifting a data migration traffic to remaining healthy communication pathways of the plurality of communication pathways, and upon recovery of the faulty communication pathway, restoring the data migration traffic therethrough.

The subject system is contemplated as a part of the RED data storage system, which may include a first plurality of client nodes and a second plurality of storage server nodes. The second plurality of storage server nodes are arranged in at least one RED cluster. The initiating node and the target node are peer nodes in the RED cluster. The RED cluster is configured with at least one reactor processor unit incorporated in each compute node in operative coupling to the target CPU cores in each target node. The reactor processor units incorporated in the plurality of target nodes are configured to communicate with each other to control the plurality of target connections in the plurality of target nodes regardless of the reactor processor unit residence.

These and other objects of the present invention will be more apparent after reading further description of the preferred embodiment(s) in conjunction with the accompanying Patent Drawings in the current Patent Application.

DETAILED DESCRIPTION OF THE PREFERRED EMBODIMENT(S)

Referring to FIGS. 2-3 and 4A-4B, the subject system 10 is a data migration and storage system which includes a number of compute nodes. The compute nodes in the present system may be either in the form of storage server nodes 12 or client nodes 24, or their combination. The storage server nodes (also referred to herein as peer nodes, servers nodes, servers, or storage nodes) 12, as well as the client nodes 24, may be arranged in groups (also referred to herein as clusters) 14. Both clients and servers cooperate to perform complex computations of various types in numerous areas of applications. The servers also store the results of the computations on the storage devices for short- or long-term storage and retrieval when needed. The clients 24 are represented by local clients 13 and remote clients 26, as will be detailed in further paragraphs.

As shown in FIGS. 2-3 and 4A-4B, the compute nodes 12 are operatively connected through a network communication channel 50. The communication channel 50 is formed between two compute nodes 12 (or between the node 12 and client 13, 26) to communicate messages therebetween. A node sending messages will be further referred to herein also as an initiating node 54, and a node receiving messages will be further referred to herein also as a target node 56. Each of the initiating node 54 and the target node 56 may be a server node 12, a client node 13, 26, and the mix thereof.

Figure 2:
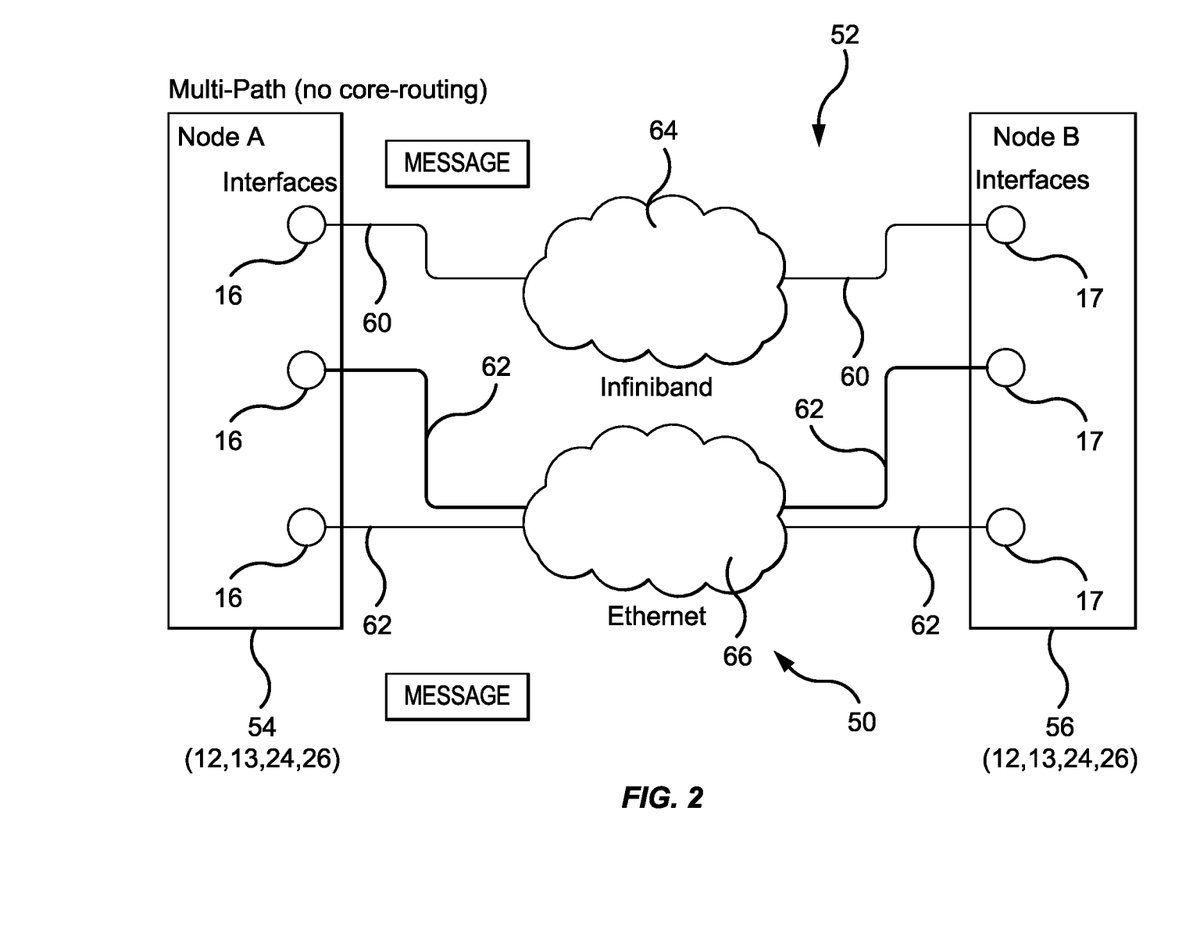
FIG. 2 is a schematic representation of an exemplary no core-routing embodiment of the subject Multi-Path solution.
Figure 3:
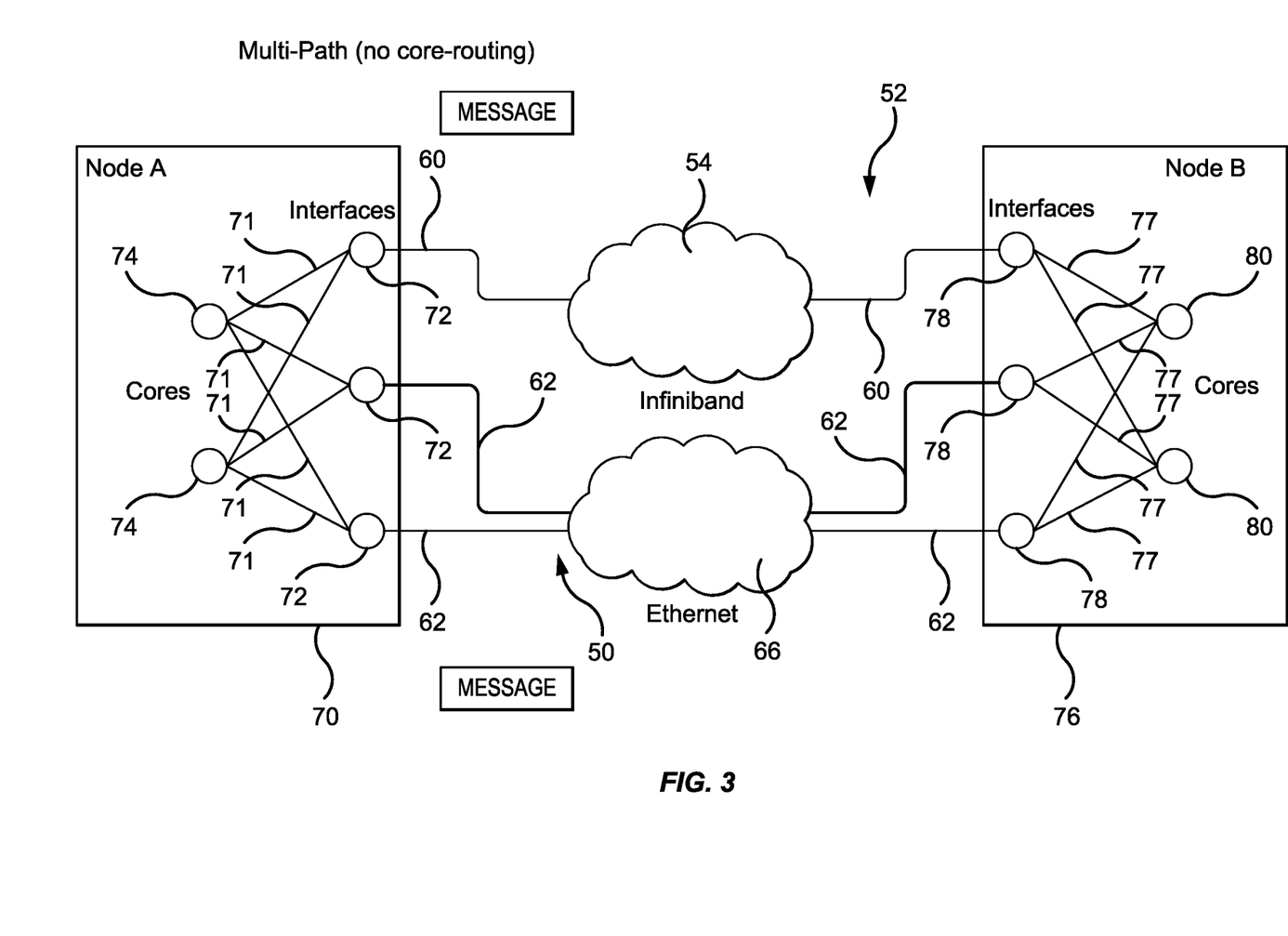
FIG. 3 is a schematic representation of an alternative core affine (core-routing) Multi-Path embodiment of the subject system.

The subject Multi-Path sub-system 52 is embedded in the system 10 to support messages transmission over multiple pathways routed on network fabric types of the same or different types between the initiating node 54 and target node 56. Specifically, the subject Multi-Path sub-system 52 is configured for supporting whole messages transmitting protocol where the whole message is created and sent over a "selected" pathway. If the message sends correctly, the transmission is completed, but if, however, the message is not sent in a correct manner, a different pathway is selected, and the message is sent over the different pathway which can be routed via the same or a different fabric type. The transmission of the whole message continues until either no pathways remain available or until the message is sent.

The Multi-Path sub-system 52 is envisioned to be applicable to numerous data migration and storage systems. In an exemplary embodiment of the numerous implementations of the system 10, such may be also referred to as a RED system which will be detailed in further paragraphs. The RED system 10 may include one or a plurality of RED clusters 14.

As shown in FIGS. 2-3, the transmission of messages is attained in the present RED system 10 between multiple initiator interfaces 16 embedded in the initiator node 54 and multiple target interfaces 17 embedded in the target node 56 in the enhanced fashion provided by the Multi-Path sub-system 52. This also supports load balancing the messages and RDMA (Remote Direct-Memory Access) operations over multiple connections 60, 62. Although FIGS. 2-3 show only two network fabric types (Infiniband and Ethernet) with the connections 60, 62, it is to be understood that the number of network fabric types, as well as the number of connections (pathways) in the communications channel 50 between the nodes 54, 56 is not limited by those shown in FIGS. 2-3, and any number of pathways, as well as other network fabric types, are applicable in the present system 10 enhanced by the Multi-Path sub-system 52.

The network communication channel 50 between the compute nodes 12, as well as between nodes 12 and the clients 13, 24, 26, may be arranged via a high-speed network, as well as via various intermediate architectural structures, commonly referred to herein as an operation supporting and enhancing layer, which may be implemented in the form of an intermediate storage layer (which may also be referred to as a burst buffer tier) which may serve as a mediator between the high performance computing architectures (such as clients 26, and compute nodes 12), or any other implementations.

The High Speed Network (HSN) functions as a high speed switch, and may be based on any of the network transport protocols, such as, for example, InfiniBand (IB), fiber channel (FC), gigabit Ethernet (GIGE), wireless LaN (WLAN), etc. In addition, the HSN may conform to the cascade, as well as Gemini architecture, may use optical fiber technology, may be proprietary, etc. Although the high speed network may include a single transport layer fabric type, the core feature of the subject system 10 is its ability to communicate messages between two nodes in the system (for example, between any initiating node 54 and any targeted node 56 in the RED cluster 14) over the transport layer formed by different network fabric types.

The present Multi-Path sub-system 52 supports the data migration and data storage through a dynamic networking layer (channel) 50 which can load balance messages and RDMA (Remote Direct Memory Access) operations over many pathways (transport layers of various network fabric types). The operation of the present sub-system 52 also supports the ability to self-heal if pathways (transport layers) experience transient network faults.

Referring to FIG. 2, which represents a no-core (no core affine) routing embodiment of the present system 10, the network communication channel 50 in the present system 10 is established between the nodes (Node A and Node B), which are also referred to as the initiating node 54 and the target node 56. The nodes 54 and 56 in FIG. 2 may be either client nodes, or server nodes, or combination thereof. The client is a computer or a process that accesses the services or recourses of another process or computer on the network. The server is a computer that provides service recourses, and that implements network services. The initiating node 54 (which may be a node 12 or a client node 24) communicates with the target node 56 (which may be any of the storage nodes 12 or the client node 24) in the system 10.

As exemplified in FIG. 2, the initiating node 54 and the target node 56 are connected through the Infiniband fabric 64 and the Ethernet fabric 66. The initiating node 54 and the target node 56 are shown as having one Infiniband connection 60 to an Infiniband fabric 64, and two Ethernet connections 62 to an Ethernet fabric 66. Thus, five pathways are established for communication between the nodes 54, 56. It is to be understood however that FIG. 2 is one of the numerous exemplary embodiments, and different number of connections, as well as alternative network fabric types, may be used as well, including, for example, FC, GIGE, WLAN, cascade, as well as Gemini architecture, etc.

As further depicted in FIG. 2, each of the initiating node 54 and the target node 56 is built with numerous interfaces 16, 17, respectively, where the initiating interfaces 16 are embedded into the initiating node 54 while the target interfaces 17 are embedded in the target node 56. Each interface 16 is able to "talk" to the interfaces 17, while each interface 17 can "talk" to the interfaces 16. Thus, the embodiment system shown in FIG. 2 provides five network paths over which the connections for communication between the nodes 54 and 56 can be accomplished.

Referring to FIG. 3, another embodiment of the present system 10 is depicted which supports the core-routing Multi-Path solution, also referred to herein as a core-affine embodiment. In the embodiment of the system 10 depicted in FIG. 3, the initiating node 70 includes initiating interfaces 72 and CPU cores 74 which are interconnected with the initiating interfaces 72 on the initiating node 70. Likewise, the target node 76 includes target interfaces 78 and CPU cores 80 interconnected with the target interfaces 78 on the target node 76.

Similar to the Multi-Path no-core routing embodiment shown in FIG. 2, the Multi-Path core routing embodiment shown in in FIG. 3 has each node connected to various transport layers such as, for example, to the Infiniband fabric 64 and the Ethernet fabric 66.

Specifically, as shown in FIG. 3, each node 70, 76 has an interface connected to the Infiniband fabric 64 via Infiniband connections 60, while the interfaces in the initiating node 70 and the target node 76 are connected to the Ethernet fabric 66 via two Ethernet connections 62. Each CPU core 74 and 80 in the initiating node 70 and the target node 76, respectively, can establish connections over various pathways, between the two nodes 70 and 76. Each initiating CPU cores 74 can directly access the initiating interfaces 72 via the connections 71 in the initiating node 70, while each target CPU core 80 can directly access the local target interfaces 78 in the target node 76 via the connections 77. Once a respective connection 71, 77 is created between the CPU cores and their local interfaces, such connection is "anchored" to the CPU core, and only that CPU core can read-write over this connection. Such arrangement prevents locks and memory sharing, and thus, is important for the system performance.

The subject Multi-Path sub-system 52 is applicable to various applications which are both core-affine such as, for example, the HPC (High Performance Computing), shown in FIG. 3, and those which are not core-affine, as shown in FIG. 2. The balancing of messages/RDMA (Remote Direct Memory Access) operations and handling of network errors are all attained with a simple send/receive API (Application Programming Interface). Application only requires specification of the target node for a message and optionally, a CPU core number, in the case of the core affine target, shown in FIG. 3.

An important advantage of the subject Multi-Path sub-system 52 is that it operates on Remote Procedure Call (RPC) "messages" (as opposed to the packets in the existing systems), for example, the Multi-Rail system which slices a message into packets, usually based on the MTU (message transmitting unit), which transmit over the same TCP/IP fabric corresponding to the packets headers.

In the subject Multi-Path sub-system 52, the complete (or whole) messages (as opposed to the data packets) are load balanced over the interfaces. A single complete message may be sent over the same interface and therefore, via the connected fabric, however, a series of messages can each be sent over different interfaces to different fabric types. Thus, one message can be sent over, for example, a TCP/IP network and another message can be sent over, for example, the Infiniband network or Ethernet network, or any other fabric type transport layer which is used as the network communication channel 50 in the present system 10. Also, is the communication pathway selected for transmission of the whole message in question fails, an alternative communication pathway is selected which may be configured in the same or a different fabric type transport layer.

The cluster 14 includes multiple server nodes 12, and may include local client nodes 13. Each node 12 may be operatively coupled to other nodes 12 residing within the same cluster 14 or residing within different clusters 14 with a shared network having multiple network interfaces 16. In addition, each node 12 in the cluster 14 may be connected with the local client 13 (logically presented within the same cluster 14). Alternatively, as required by the system operation, a server node 12 may also communicate with a remote client 26 residing external the cluster of the server node 12.

As the subject system 10 is further exemplified as the RED system, the clusters will be further referred to as RED clusters 14, and the nodes in the present disclosure will be further referred to as the RED storage's servers 12, and/or clients 13, 24, 26 which have access to the corresponding RED storage servers 12, and/or their combination. Any node 12, 13, 24, 26 is configured for usage of the subject Multi-Path approach (also referred to herein as a Multi-Path sub-system) as will be detailed in further paragraphs.

In the RED cluster 14, the traffic profile is defined as either a "client-to-server" or "server-to-server". The RED storage server(s) associated with each node 12 are configured to support the communication between RED storage servers. However, the Multi-Path approach is not limited to "client-to-server" or "server-to-server" architectures, but is rather referred to as "node-node" architectures, where compute nodes 12 may be any mix of clients or servers.

Figure 4A:
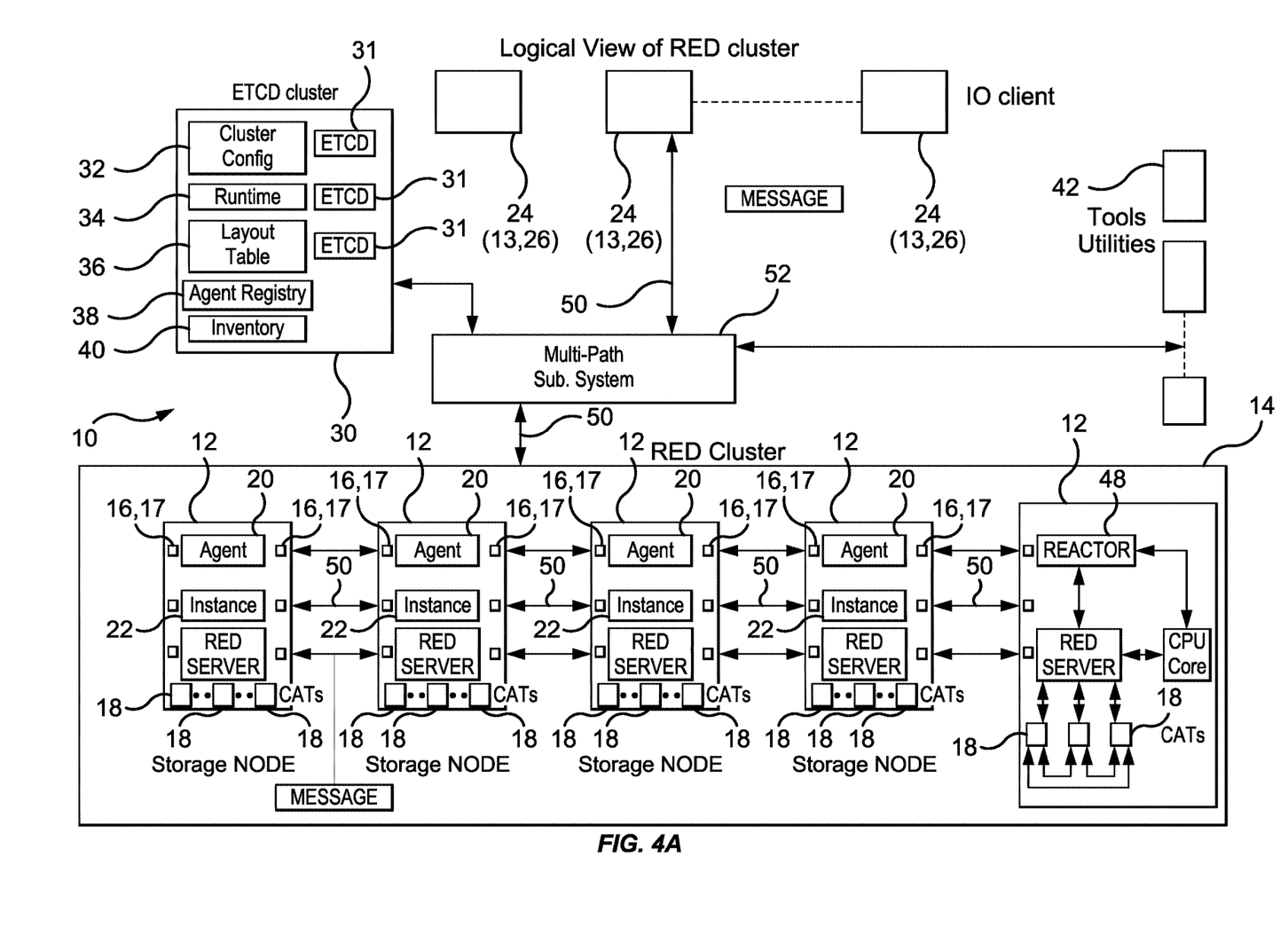
FIG. 4A is a logic block diagram of the RED system supporting an exemplary embodiment of the subject Multi-Path solution.
Figure 4B:
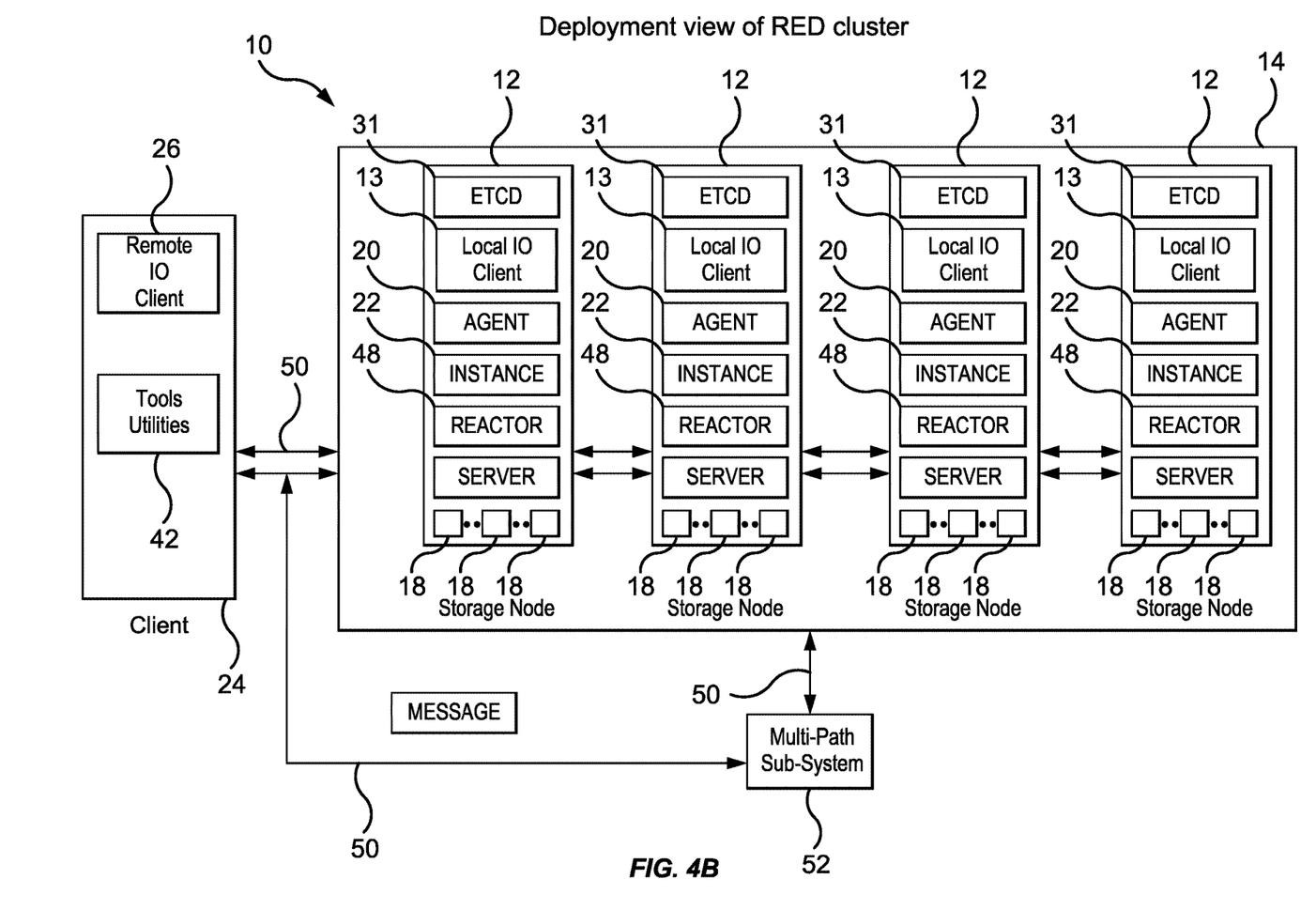
FIG. 4B is representative of a physical view of the RED cluster supporting the present Multi-Path solution.

As shown in FIGS. 4A-4B, each node 12 in the RED cluster 14 may be configured with an Agent 20 (also referred to herein as an Agent Processing Unit) which supports a Management Process running on the node 12 which monitors the nodes 12 and their functionality. Each node 12 is configured with a plurality of storage devices 18, which may also be referred to herein as Core Affined Storage Targets (CATs). The data storage system in the RED cluster 14 in the present system 10 exploits a large array of non-volatile memory (NVM) devices 18 which are arranged in a plurality of clusters 14 (or containers) where the nodes 12 may communicate with other nodes 12 in the same storage cluster (or container) 14 or with specified nodes in other RED clusters 14.

Each compute node 12 is also configured with a corresponding Instance 22 (also referred to herein as an Instance IO Server Processing Unit) which supports an IO server process running on the compute node 12. Instances 22 are generated (created) by the Agents 20. Instances 22 "own" the local CATs 18 and supply IO services to clients 24. As best shown in FIG. 4A-4B, clients 24 are represented by the local clients 13 (local to the compute nodes 12) and remote client(s) 26.

As shown in FIGS. 4A and 4B, the RED system 10 further includes ETCD cluster 30 which is a highly available distributed configuration database. The ETCD cluster 30 stores cluster configuration 32, runtime 34, layout table 36, agent registry 38, and Inventory 40. The ETCD Cluster 30 also includes databases ETCD 31 which, as best shown in FIG. 4B, reside in respective compute nodes 12.

Also depicted in FIGS. 4A and 4B is a set of tool utilities 42 which are configured for communication with the Agents 20 and the ETCD cluster 30 to create, start, stop the RED cluster operation, OR query the status, etc.

FIG. 4B is representative of the physical view of an exemplary embodiment of the RED cluster 14. In one of numerous exemplary embodiments, the compute nodes 12 in the RED cluster 14 may run various Linux containers using Docker/k8s. In this exemplary embodiment, the Agent 20 and the Instance 22 run in a single Linux container, with the Agent container controlling the access to the local CATs 18. As shown in FIG. 4B, in one of the possible embodiments, three ETCD servers 31 of the ETCD cluster 30 run on any three compute nodes 12 in the RED cluster 14. The local client 13 and tools utilities 42 can run on any compute node 12 other than the RED cluster nodes 12, to perform IO operations to the RED cluster 14. As depicted in FIG. 4B, the RED cluster 14 may be operatively coupled to a remote IO client 26 and the tool utilities 42.

The Instance IO server processing unit 22, also referred to herein as Instance, resides in the RED cluster 14. The Instance IO server processor unit 22 is executed by different threads running within the Instance 22. These threads may include a Cluster Manager thread which is responsible for handling the cluster management, Instances and CATs, Evicts and joins from and to the RED Cluster 14, makes all the intelligent decisions to grow and/or shrink the Cluster, and communicates with ETCD cluster, as well as publishes the run time.

The Instance 22 further includes an Instance Manager thread which is responsible for Local Instance configuration management, and monitors and controls all of the needs of the Local Instance.

The Instance Manager is also responsible for, among other functions, controlling the openings and closures of the CATs, sampling the gossip operation from the Gossip Manager and publishes the Gossip to the CATs.

Reactor threads 48 are also included in Instance 22. The Reactors 48 are bound to a specific RED Cluster and run different tasks. For example, Reactors run handler tasks (handler processing units) which are responsible for replication and routing requests from clients/servers to local CATs or remote Instances 22. The reactor thread may run a task which may be specific to Gossip manager which is responsible for the scalable broadcasts of essential information.

Gossip Manager provides Gossip information to all subsystems, while the Cluster Manager and Instance Manager may publish data and information over the Gossip messages.

The Instance 22 process also may include another reactor which runs the task for the CAT dedicated to another reactor. All activities involving CATs are executed by the reactor task running on the local core of CAT. Having this configuration, the RED system 10 avoids unnecessary locking by sending messages to intended handlers of the CAT. Each CAT 18 provides a persistent storage target for replicated data, hosts Intent Log, and includes a BepTree.

The operation of compute nodes 12 in the RED cluster 14 depends on the system application. They may function as servers, supercomputing clusters, etc., and have a capacity to "write" by outputting the data to an external memory, as well as "read" data from an external memory, or other type storage media.

The subject RED system presented in simplified form in FIGS. 2-3 and 4A-4B, focuses on balancing complete messages rather than packets or connections. Each pathway 60, 62 is given credits and a weight which are used to control the balancing of messages over the possible pathways, and it operates in a weighted "round-robin" format, which adapts dynamically.

In the case of the core-affine applications, shown in FIG. 3 (i.e., for the HPC embodiments and RED servers), the pathways which deliver messages to the destined CPU core are given the highest priority. A core is a CPU (Central Processing Unit) or processor which can independently perform, or process, all computational tasks and may be considered as a smaller CPU or a smaller processor within a big processor. CPU affinity enables binding or unbinding a process, thread, or multiple processes, to a specific CPU core or to a subset of CPU cores. As an example only, but not to limit the scope of the present invention to a specific CPU core, the following description will be presented in a manner that the process(es) will run from the specific core, i.e., will execute on the designated CPU(s). At the time of resource allocation, each task is allocated to its related processor in preference to others. Processor affinity takes advantage of the fact that remnants of a process that is run on a given processor may remain in that processor's state (for example, data in the cache memory) after another process was run on that processor. Scheduling a CPU-intensive process that has few interrupts to execute on the same processor may improve performance by reducing degrading events such as cache misses, but may slow down ordinary programs since they would need to wait for that CPU to become available again.

In the present system, the message order created by an initiating node 54 is not important. System 10 adapts and self-heals in a highly efficient manner and eases the implementation to a "fragile RPC" approach to the application.

Typically, applications communicate via 7 network switch layers, including (from top to bottom) application, presentation, session, transport, network, data link and physical layers. The prior art Multi-Rail system operates in the transport layer. The present system however uses the upper layers (application, presentation, and session), to specify to the initiating node 54 that they want to send a message to a specific peer (node), i.e., the target node 56, and the subject Multi-Path system 10 selects the pathway the message will be transmitted over. This allows the pathways to be changed dynamically without affecting the upper layers.

The subject system 10 has the ability to route messages between the CPU cores 74, 80 embedded in the nodes 70, 76, respectively (as shown in FIG. 3) which the application is bound to. The HPC (High Performance Computing) uses a technology called MPI (Message Passing Interface) which is a standardized and portable message-passing standard design to function on parallel computing architectures. The MPI standard defines a syntax and semantics of library routines that are useful to wide-range of users writing portable message-passing programs in C++, and Fourtran. There are several open source MPI implementations, which fostered the development of a parallel software industry, and encouraged development of portable and scalable large-scale parallel applications. The MPI technology binds "ranks" of the application to specific cores. MPI has an infrastructure for communicating these ranks with each other regardless of what physical nodes the ranks run on.

In the RED system 10, the servers 12 bind the reactors 48 (which are incorporated in the Instance in the node 12 for the RED cluster 14 as described in previous paragraphs) to the CPU cores and communicate in a similar fashion as MPI on the RED server 14, but not on the RED client 24 side. Reactors 48 form a foundational framework for the data storage distributed systems, which create concurrent and distributable applications more easily, by providing correct and robust programming extractions. Based on the reactor model for the distributed programming, reactors allow writing location-transparent programs that can be easily sub-divided into modular components. Reactors make it easier to reason about concurrent programs. Separate reactors communicate by exchanging events through channels. At the same time, the reactor model is location-transparent, which means that they can develop and task the program on a single machine, and then seamlessly deploy it on multiple machines that are connected with the computer network.

Basically, the subject Multi-Path solution 52 takes into account "core routing" in the algorithm underlying the operation of the Multi-Path sub-system 52. Each CPU core 74 (as depicted in FIG. 3) can create connections over the various pathways which are established between the two nodes (the initiating node 54 and the target node 56). This means that each CPU core 74 will directly access the local interfaces 72, and, once the connection 71 is created, the local interfaces 72 "anchor" to that core 74 and only that core can read/write the connection.

The Multi-Path approach is of specific benefit to the composite nodes when:
 (a) low latency is critical, which can be achieved in the present arrangement with the multiple paths running in parallel;
 (b) resiliency is crucial which needs multiple instances of hardware, such as network interfaces (if one interface fails, other interfaces will take over);
 (c) scalability is critical and is not a fixed element (i.e., the workload can change dynamically over time and needs to be adapted; and (d) messages can arrive in a different order than they were sent out.

The present system 10 includes a support logic layer which is designed to support the operation of the present Multi-Path sub-system 52. The support logic layer may be embedded either in each node including the nodes at the client 26 side (referred to herein as client nodes) and the nodes 12 in the RED cluster 14 (referred to herein as storage server nodes), or it may be a layer connected between the nodes 26 and the nodes 12 through the high-speed network.

Figure 5:
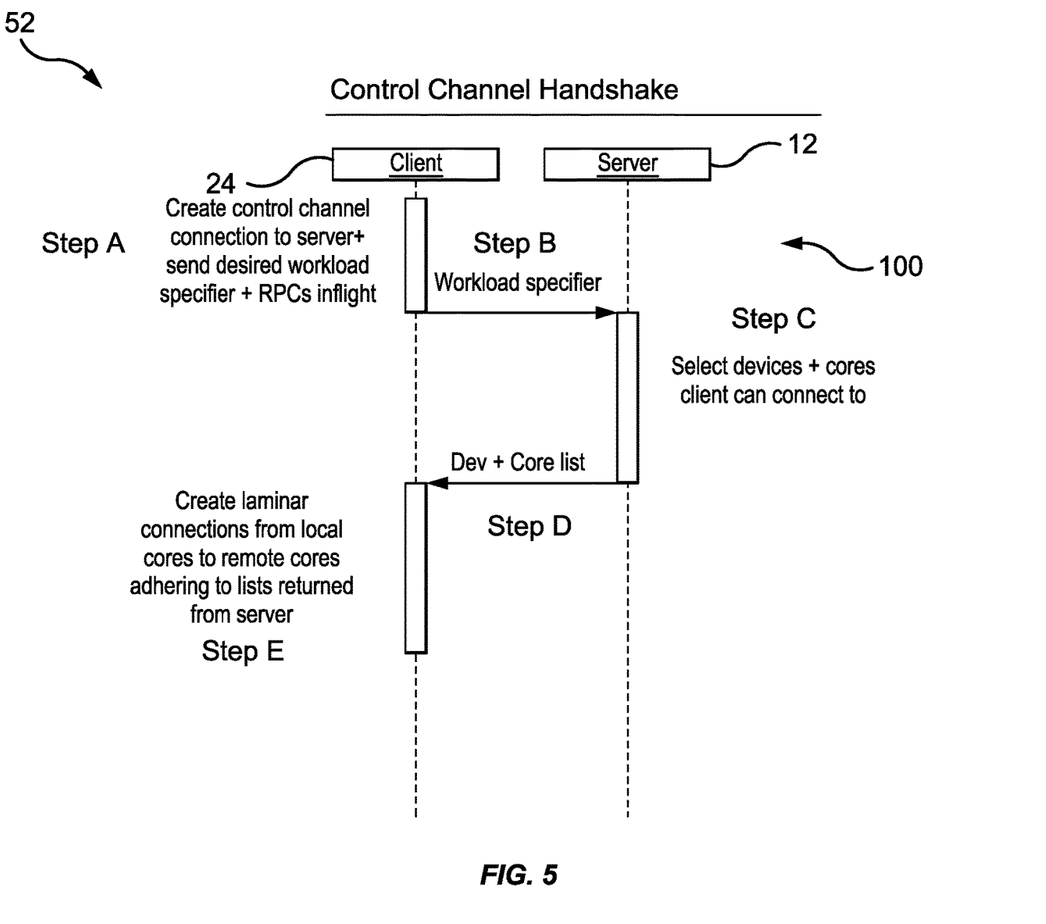
FIG. 5 is a flow chart diagram representative of the control channel "handshake" routine in the subject system.

One of the constituents of the support logic layer is the control channel "handshake" routine 100, presented in FIG. 5. In order to initiate the operation of the Multi-Path system, an initiating node 54 (for example, the client node 13, 24, 26), establishes a "control channel" to the target node 56 (for example, the compute node 12 in the RED cluster 14). The routine of establishing the control channel between the initiating node 54 and the target node 56, for example, it may be a DNS look-up to obtain an address for the target node 56 to which the initiating node 54 chooses to be connected. Subsequent to obtaining the address of the target node 56, the initiating node 54 sends control requests to the target node 56.

Over the established control channel between the initiating node 54 and the target node 56, a request is sent by the client node (initiating node) 54 to the target (server) node 56 telling it what "workload" the client node intends to place upon the server node (target node) 56 along with resource information including how many RPC (Remote Procedure Call) messages in flight that the client node would like to send. The RPC message protocol consists of two structures: the call message and the reply message. The client node 26 (also referred to herein as the initiator node 54) makes a remote procedure call to the network server node 12 (target node 56) and receives a reply containing the results of the procedure's execution. By providing a unique specification for the remote procedure, the RPC can match a reply message to each call (or request) message.

In one of the exemplary embodiments, the routine 100 for establishing the control channel "handshake" between the client node 24 (which may be a local client 13 or a remote client 26) and the server node 12, as shown in FIGS. 5 and 3, begins in Step A, where the initiating node (i.e., the client node 24) obtains the address of the target node requested by upper software layers and creates a control channel connection to the target node (i.e., the server 12). In a subsequent step B, the client node 24 sends a desired workload specifier plus RPS messages in flight over the control channel. In the following Step C, the server (target) node receives the request and determines how many and which CPU cores on the server node 12 the client node 26 is able to connect to. A list of the target CPU core identifications (ids) along with a list of the target interfaces addresses on the server node 12 (alternatively combined in a single list) are returned in Step D to the client node 24 as a response to the initiating node's request.

Subsequently, in Step E, the client node 24 uses the target CPU cores IDs and the server's interfaces addresses list(s) to create connections over the various pathways to the target CPU cores 80 in the target node 76, as depicted in FIG. 3, in a laminar fashion (i.e., only one connection existing for each selected target CPU core). This set of connections represents the Multi-Path connection the client node 24 has with the server (target node) 12.

Figure 6:
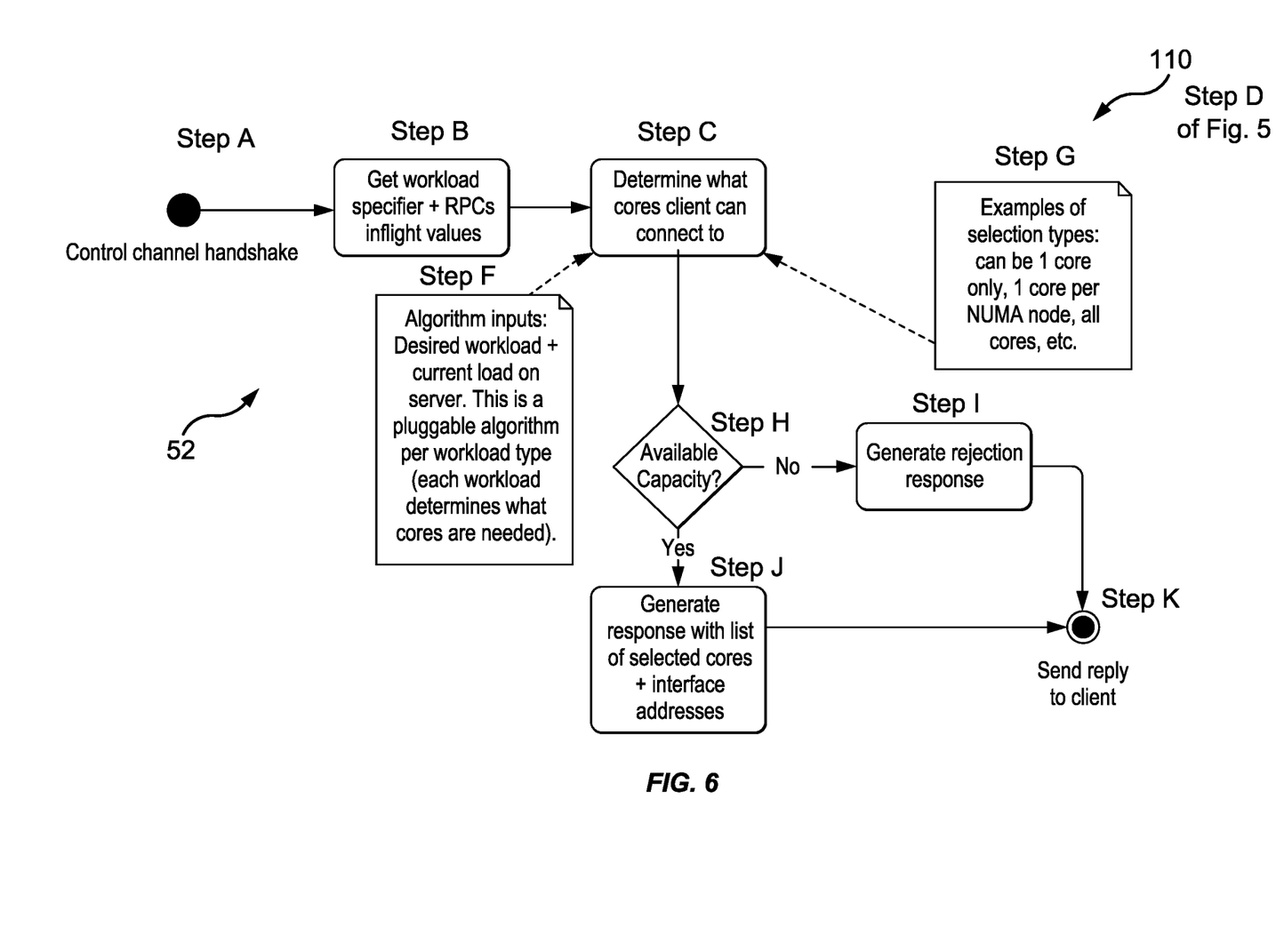
FIG. 6 is a flow chart diagram representative of the routine for generating a list of target CPU cores for the client's connection.

During the Steps B and C of the control channel "handshake" routine 100 depicted in FIG. 5, the Multi-Path sub-system 52 executes a routine 110 for generation of the list of target CPU cores at the server node 12. The flow chart shown in FIG. 6 (in conjunction with FIG. 3) details the logic used by the server node 12 (target node) when generating the list of the target CPU cores that the client can connect to. As shown in FIG. 6, subsequent to the establishing of the control channel and accomplishing the control channel handshake in step A of FIG. 5, the logic proceeds to Step B in which the server node 12 receives workload specifier and RPCs in flight values from the initiating client node 24.

From Step B, the logic flows to Step C where the target server node 12 determines what target CPU cores the client node 24 can connect to.

As depicted in FIG. 6, from Step C, the logic passes to Step F where the routine 110 inputs a desired workload and current flow to the server node 12. The logic uses a specific algorithm designed for each workload type to select local target CPU cores. These algorithms are pluggable and are designed to meet the cluster's specific needs. The RED system 10 has its own set of pluggable algorithms for the target CPU cores selection. The objective of the routine in step F is to determine what target CPU cores are needed for accomplishing the workload type in question and to balance the client's workload with the availability of the CPU cores in the target server node 12.

In Step G, the target server node may select numerous versions of arrangements for the target CPU cores for which the initiating client node 24 can be connected to. The selection types may specify an arrangement with only one CPU core, or this may be one CPU core per NUMA core, or all cores, etc. NUMA is a Non-Uniform Memory Access architecture which is a multi-processing architecture in which memory is separated into close and distant banks. In NUMA, the memory on the same processor board as the CPU (local memory) is accessed faster than the memory on outer processor boards (shared memory), hence the "non-uniform" nomenclature. NUMA architecture scales well to high numbers of CPUs.

From Step C, the procedure advances to logic block where the server node 12 determines in step H if there is an available capacity in the target server node 12 for the client's message(s). If there is the capacity available for accepting the message(s), the logic flows to Step J in which the server 12 generates a response to the client node 24 containing the list of selected target CPU cores in the target server node 12 and the target interfaces addresses. However, if the server node 12 becomes overloaded as the result of the operation in question, it can trigger the client node 24 to execute the control handshake routine again to get a new set of target CPU cores and adapt the connection pool of target CPU cores to match the server's new criteria. Specifically, in the case of the target node overload, the logic advances from Step H to Step I where the server generates rejection response and sends the reply to the client in Step K. This way, the Multi-Path sub-system 52 is dynamically adapted to changing load conditions. When the client node 24 (initiating node 54) has a Multi-Path set of connections, it binds messages destined to the server node 12 (target node 56) based on the flow chart diagram shown in FIG. 7 (in conjunction with FIG. 3). Optimally, if there is a connection 60, 62 established from the sending initiating CPU core 74 to the target CPU core 80 (as exemplified in FIG. 3), that connection will always be used because it provides the lowest latency, and consequently provides the best performance of the system. Otherwise, a Weighted Fair Queue algorithm is applied to select which of the existing connections will be used to send the message(s). This means that the message may need to be transferred between the CPU cores on either the initiating node 70 or server-side node 76. Such a transfer still provides improved performance, and scalability, when taken with respect to using a lock mechanism to allow multiple cores to send/receive over the same connection.

Figure 7:
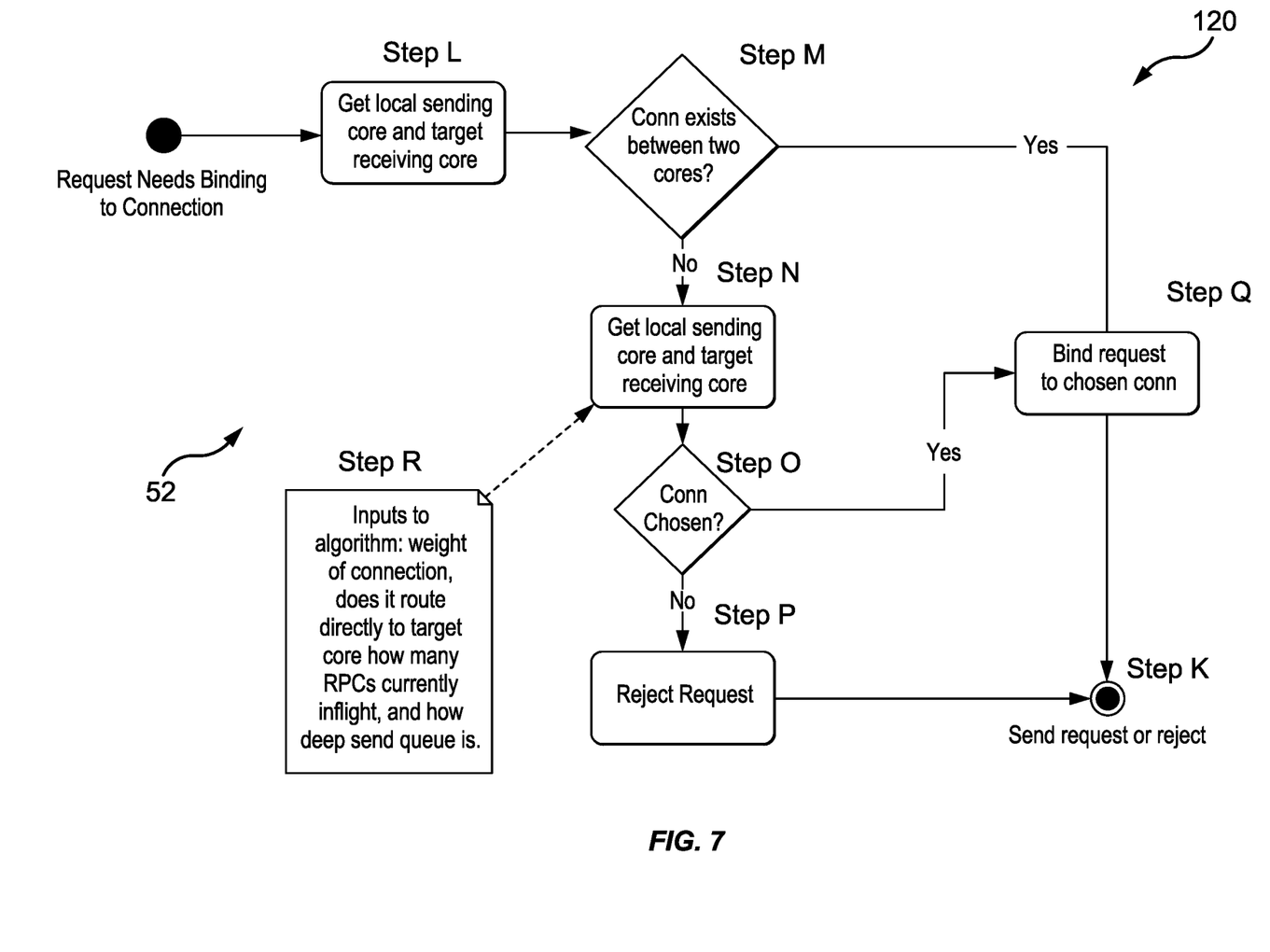
FIG. 7 is a flow chart diagram of the routine for binding messages destined to the server.

Referring to FIGS. 7 and 3, the routine 120 of binding messages destined to the target server node 76 is initiated by receiving the request for binding the message to a connection. Responsive to the receiving of the request for binding to a connection, the logic 120 flows to step L "Get Local Sending Core and Target Receiving Core" in which an initiating CPU core 74 and the target CPU core 80 are obtained. Subsequently, from step L, the logic flows to step M where the logic decides whether the connection exists between the two CPU cores obtained in the previous step L, i.e., the local sending core and the target receiving core. If in step M the logical decision is that there is no connection between the local sending core and the target receiving core, the procedure advances to Step N for applying Weighted Fair Queue Algorithm to Connections. Subsequently, the logic passes to Step O to decide whether the valid connection is chosen. If the connection is not chosen, the logic advances to Step P where the request is rejected.

Returning to Step M, if the logic decides that there is a connection which exists between the sending CPU core and the target receiving CPU core, the procedure advances to Step Q where the request for binding to connection is met for the chosen connection. From Step Q, the logic flows to the ending procedure to "Send Request or Reject".

Returning now to Step O, if the logic decides that the valid connection chosen, the procedure flows to Step Q and the request to bind to the chosen connection is satisfied. If however in Step O, the logic decision is that connection is not chosen, the logic flows to Step P to reject the request.

Returning again to Step N, in order to execute the procedure of applying Weighted Fair Queue algorithm to connections in question, the logic inputs in step R the parameters which the algorithm requires for computations, including the weight of the connection(s), identification whether the connection(s) route(s) directly to the target CPU core, a number of RPC messages currently in-flight, and the depth of the send queue.

As presented in previous paragraphs with regard to FIGS. 2-7, the Multi-Path solution is designed with the purpose of creating multiple connections between application cores across multi-interfaces on both the initiator and target nodes and for load balancing the message and RDMA operations over those multiple connections. The Multi-Path approach adapts dynamically to applications which are core-affine (like, for example, in HPC) and those which are non-core affine. The balancing of messages/RDMA operations and handling of network errors are attained with a simple send/receive API. The application needs only to specify the target node for a message and, optionally, a core number in the case of a core-affine target.

The Multi-Path approach to data migration focuses on balancing complete (whole) messages rather than packets or connections. Each pathway for a message is given a credit and a weight so that these two parameters are used to control the balancing of messages over the possible pathways, and this approach becomes a form of weighted "round-robin" which adapts dynamically to the workload. In the case of core-affine applications, i.e., HPC procedures and RED servers, pathways which deliver messages to the destined core are always given the highest priority.

The subject Multi-Path approach adapts dynamically to network errors by excluding failing pathways, as needed, and shifting traffic to remaining healthy pathways, where background recovery of pathways runs periodically for self-healing.

The present approach provides a highly efficient and scalable distributed storage system where message order is not of importance as the case with the subject RED system, which is capable of adapting and self-healing in efficient manner, and which makes it much easier to implement a "fragile RPC" approach to the application specific to the RED system.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A method for migrating data between compute nodes in a distributed data storage system, comprising:

configuring a distributed storage system with a plurality of compute nodes and a Multi-Path sub-system integrated in said distributed storage system in operative coupling with said plurality of compute nodes, wherein said plurality of compute nodes include at least one initiating node and at least one target node, wherein said Multi-Path sub-system is configured with a plurality of initiating interface units incorporated in said at least one initiating node and a plurality of target interface units incorporated in said at least one target node, and wherein a plurality of communication pathways are operatively coupled between said plurality of initiating interface units and said plurality of target interface units;

forming, by said distributed storage system, at least one whole message and incorporating an identification of said at least one target node in said at least one whole message, wherein said at least one whole message is based on a Remote Procedure Call (RPC) protocol;

selecting, by said Multi-Path sub-system, at least one first pathway from said plurality of communication pathways for sending said at least one whole message;

sending said at least one whole message from said at least one initiating node to said at least one target node over said at least one first pathway;

selecting, by said Multi-Path sub-system, at least one second pathway from remaining communication pathways of said plurality of communication pathways for sending said at least one whole message if the communication over said at least one first pathway has failed, wherein said at least one first and at least one second pathways are selected from a group consisting of the pathways routed via the same network fabric type, different network fabric types, and a combination thereof; and sending said at least one whole message from said at least one initiating node to said at least one target node over said at least one second pathway.

2. The method of claim 1, further comprising: incorporating a plurality of initiating CPU cores in said at least one initiator mode, and incorporating a plurality of target CPU cores in said at least one target node.

3. The method of claim 2, further comprising: forming a connection between each of said plurality of initiating CPU cores to said plurality of initiating interface units, thus creating a plurality of initiating connections in said at least one initiating node, and forming a connection between each of said plurality of target CPU cores to said plurality of target interface units, thus creating a plurality of target connections in said at least one target node.

4. The method of claim 3, wherein said Multi-Path sub-system is configured on a dynamic networking logic layer above a transport logic layer, further comprising:
dynamically adapting said Multi-Path sub-system to applications selected from a group consisting of core affine applications, not core affine applications, and a combination thereof.

5. The method of claim 4, further comprising: for core-affine applications, specifying, by said distributed storage system, identification of a target CPU core of said plurality of target CPU cores for said at least one whole message for said at least one target node.

6. The method of claim 5, further comprising:
assigning the highest priority to at least one of said plurality of communication pathways delivering said least one whole message to said specified target CPU core in said at least one target node.

7. The method of claim 6, further comprising:
assigning ranking coefficients to said plurality of communication pathways, and
balancing the sending of said at least one whole message over said plurality of communication pathways in accordance with said ranking coefficients.

8. The method of claim 1, further comprising:
adapting dynamically said Multi-Path sub-system to network errors by the steps of:
monitoring health of said plurality of communication pathways to determine at least one faulty communication pathway,
excluding said at least one faulty communication pathway from operation,
shifting a data migration traffic to remaining healthy communication pathways of said plurality of communication pathways, and
upon recovery of said at least one faulty communication pathway, restoring the data migration traffic therethrough.

9. The method of claim 3, further comprising:
incorporating at least one reactor processor unit in each compute node of said plurality of compute nodes, wherein said plurality of compute nodes include a plurality of target nodes,
operatively coupling said at least one reactor processor unit to said plurality of target CPU cores in each target node of said plurality of target nodes, and
communicating said reactor processor units incorporated in said plurality of target nodes with each other to control said plurality of target connections in said plurality of target nodes regardless of said at least one reactor processor unit residence.

10. The method of claim 3, further comprising:
establishing, by said Multi-Path sub-system, a control channel between said at least one initiating node and said at least one target node by the steps of:

sending, by said at least one initiating node, a workload request to said at least one target node, wherein said workload request identifies a workload type corresponding to said at least one whole message intended for sending to said at least one target node and a desired value of Remote Procedure Calls (RPCs) inflight,
subsequent to receiving said workload request, defining, by said at least one target node, a first plurality of target CPU cores and a second plurality of target interface units available for serving said at least one whole message receipt,
creating, by said at least one target node, a list of identifications of said first plurality of target CPU cores and of said second plurality of target interface units, and
sending, by said at least one target node, said lists to said at least one initiating node; and
creating, by said at least one initiating node, said at least one first and at least one second pathways, each between at least one initiating CPU core and a corresponding at least one target CPU core from said at least two target CPU cores in accordance to said list.

11. The method of claim 10, further comprising:
in said step of creating of said list of identifications of said first plurality of target CPU cores, plugging in a workload balancing processor unit configured for selecting said first plurality of target CPU cores for said at least workload type.

12. The method of claim 11, further comprising:
if said first plurality of target CPU cores identified in said list is not available, rejecting, by said at least one target node, the control channel established by said Multi-path sub-system, and requesting establishing an alternative control channel by forming an alternative list of the target CPU cores and of the target interface units available for receiving said at least one whole message.

13. The method of claim 1, further comprising:
adapting dynamically said Multi-Path sub-system to network load by the steps of:
monitoring load of said plurality of communication pathways to determine at least one slow communication pathway,
reducing a data migration traffic for said at least one slow communication path,
shifting the data migration traffic to remaining communication pathways of said plurality of communication pathways, and
upon decreasing of the load of said at least one slow communication pathway, restoring the data migration traffic therethrough.

14. The method of claim 13, wherein said plurality of compute nodes include a first plurality of client nodes and a second plurality of storage server nodes, further comprising:
arranging said second plurality of storage server nodes in at least one cluster, wherein said at least one initiating node at said at least one target node are peer nodes in said at least one cluster.

15. The method of claim 5, further comprising:
subsequent to creating said at least one first pathway between said at least one initiating CPU core and a corresponding at least one target CPU core, binding said at least one whole message destined to said at least one target node by Weighted Fair Queue routine applied to said remaining communication pathways to choose said at least one second pathway for sending said at least one whole message, wherein the Weighted Fair Queue routine considers a weight of said remaining communication pathways, indication of a direct route between the initiating CPU core and the target CPU core, a number of RPC inflight messages, and a depth of a send queue.

16. A distributed data storage system for migrating data between compute nodes, comprising:
a plurality of compute nodes and a Multi-Path sub-system integrated in said distributed data storage system in operative coupling with said plurality of compute nodes, wherein said plurality of compute nodes include at least one initiating node and at least one target node, where said at least one initiating node comprises a first memory and a first processor and said at least one target node comprises a second memory and a second processor,
wherein said Multi-Path sub-system is configured with a plurality of initiating interface units incorporated in said at least one initiating node and a plurality of target interface units incorporated in said at least one target node, and
wherein a plurality of communication pathways are operatively coupled between said plurality of initiating interface units and said plurality of target interface units;
said distributed storage system being configured for migrating at least one whole message incorporating an identification of said at least one target node from said at least one initiating node to said at least one target node over at least one first pathway of said plurality of communication pathways and at least one second pathway of said plurality of communication pathways if said at least one first pathway has failed, wherein said at least one first and at least one second pathways are selected from a group consisting of the pathways routed via the same network fabric type, different network fabric types, and a combination thereof.

17. The system of claim 16, further comprising:
a plurality of initiating CPU cores incorporated in said at least one initiator mode, and
a plurality of target CPU cores incorporated in said at least one target node,
a plurality of initiating connections formed in said at least one initiating node, with each initiating connection formed between each of said plurality of initiating CPU cores and said plurality of initiating interface units, and
a plurality of target connections formed in said at least one target node, with each target connection formed between each of said plurality of target CPU cores and said plurality of target interface units.

18. The system of claim 17, wherein said Multi-Path sub-system is selected from a group consisting of core affine applications, not core affine applications, and a combination thereof, and wherein said Multi-path sub-system is configured for operation on a dynamic networking logic layer above a transport logic layer.

19. The system of claim 17, wherein said Multi-Path sub-system is further adapted for dynamic self-healing by:
monitoring health of said plurality of communication pathways to determine at least one faulty communication pathway,
excluding said at least one faulty communication pathway from operation,
shifting a data migration traffic to remaining healthy communication pathways of said plurality of communication pathways, and
upon recovery of said at least one faulty communication pathway, restoring the data migration traffic therethrough.

20. The system of claim 17, wherein said plurality of compute nodes include a first plurality of client nodes and a second plurality of storage server nodes, wherein said second plurality of storage server nodes are arranged in at least one cluster, and wherein said at least one initiating node and said at least one target node are peer nodes in said at least one cluster,
further comprising:
at least one reactor processor unit incorporated in each compute node of said plurality of compute nodes, wherein said plurality of compute nodes include a plurality of target nodes, wherein said at least one reactor processor unit is operatively coupled to said plurality of target CPU cores in each target node of said plurality of target nodes, and wherein said reactor processor units incorporated in said plurality of target nodes are configured to communicate with each other to control said plurality of target connections in said plurality of target nodes regardless of said at least one reactor processor unit residence.

* * * * *